US007019469B1

(12) United States Patent
Thurk et al.

(10) Patent No.: US 7,019,469 B1
(45) Date of Patent: Mar. 28, 2006

(54) SINEWAVE DIMMER CONTROL METHOD

(75) Inventors: John P. Thurk, Madison, WI (US); Eric W. Suomi, Madison, WI (US); Eric G. Rasmussen, Waunakee, WI (US)

(73) Assignee: Electronic Theatre Controls, Inc., Middleton, WI (US)

( * ) Notice: Subject to any disclaimer, the term of this patent is extended or adjusted under 35 U.S.C. 154(b) by 0 days.

(21) Appl. No.: 10/971,682

(22) Filed: Oct. 21, 2004

(51) Int. Cl.
*H05B 37/00* (2006.01)

(52) U.S. Cl. .................. 315/307; 315/287; 315/DIG. 4

(58) Field of Classification Search ...................... None
See application file for complete search history.

(56) References Cited

U.S. PATENT DOCUMENTS

| | | | |
|---|---|---|---|
| 4,998,046 A * | 3/1991 | Lester | .................... 315/209 R |
| 5,045,774 A | 9/1991 | Bromberg | |
| 5,424,618 A | 6/1995 | Bertenshaw et al. | |
| 5,500,575 A | 3/1996 | Ionescu | |
| 5,714,847 A | 2/1998 | Lindauer et al. | |
| 5,770,928 A | 6/1998 | Chansky et al. | |
| 5,949,197 A | 9/1999 | Kastner | |
| 6,346,778 B1 | 2/2002 | Mason et al. | |

OTHER PUBLICATIONS

Freescale Semiconductor Inc. (Motorola) ; Hybrid flash solution; date unknown; prior to present invention.
Freescale Semiconductor Inc. (Motorola) ; 56F803 Evaluation Module Hartdware User's Manual, Rev. 4; Jun. 3, 2003.

* cited by examiner

*Primary Examiner*—David Vu
(74) *Attorney, Agent, or Firm*—Greer, Burns & Crain, Ltd.; Philip M. Kolehmainen

(57) ABSTRACT

An input line filter separates an ac sinusoidal power source from a power switching stage having a series switching section and a clamp switching section. Both the series switching section and a clamp switching section include complementary pairs of high power and high speed MOSFETs. The series switching section is connected in series between the input line filter and the inductor of an output load filter between the power switching stage and a load. The clamp switching section is connected to shunt the inductor and load. Synchronous operation is achieved by alternately operating the series and clamp switching sections to conductive conditions at a high pulse width modulation frequency. The duty cycle is selected to provide a sinusoidal output waveform with a desired amplitude. A microprocessor based programmable controller provides control signals for alternate conduction of the series and clamp switching sections. A dead time interval stored in memory in the controller separates the control signals for reliable and efficient operation. The dead time interval may be constant, or may be varied in accordance with load power variations.

17 Claims, 4 Drawing Sheets

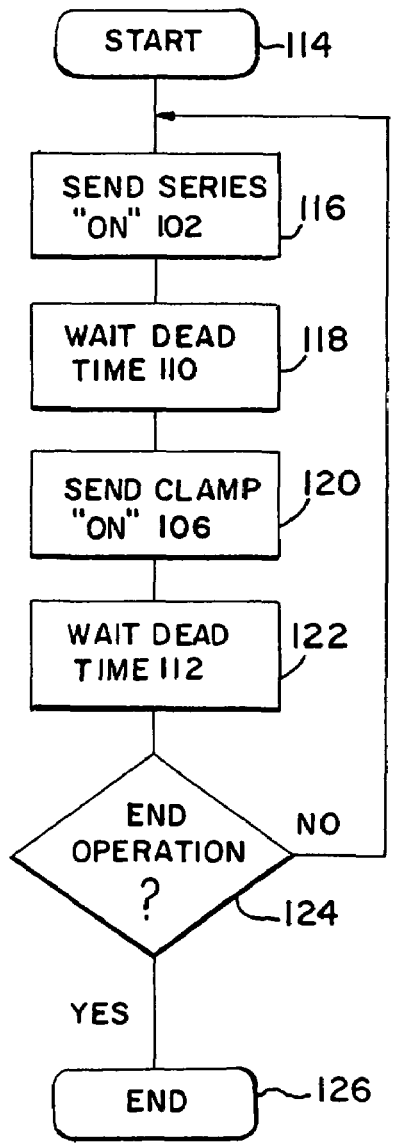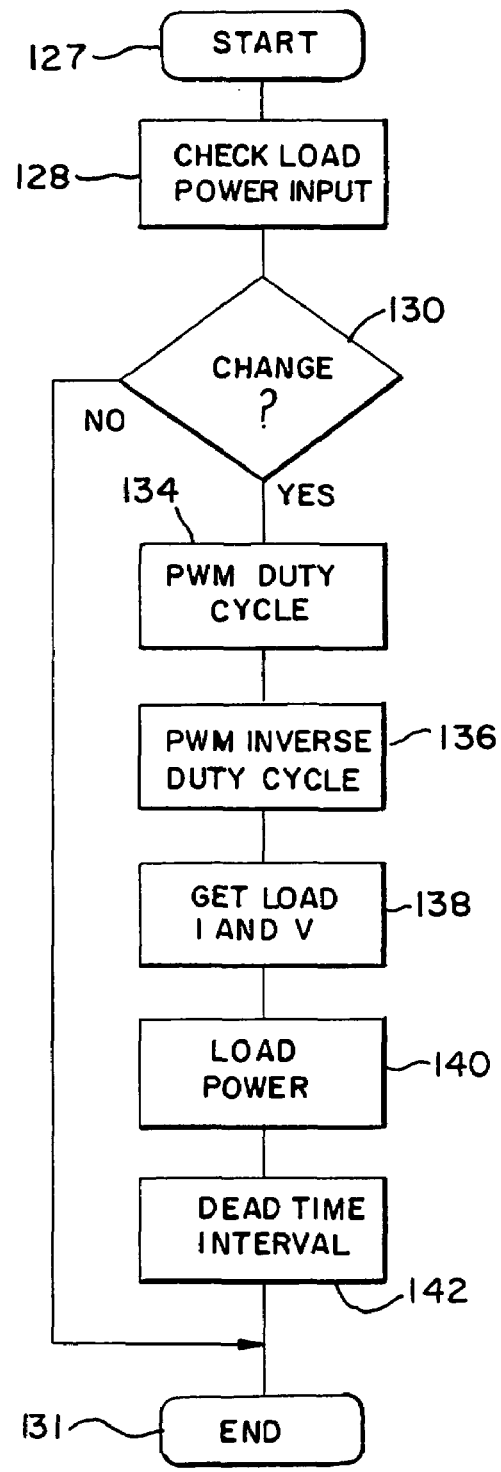

SINEWAVE DIMMER CONTROL METHOD

FIELD OF THE INVENTION

The present invention relates to a method for controlling a sinewave dimmer in order to achieve reliable operation and efficient power transfer through an inductive dimmer output filter.

DESCRIPTION OF THE PRIOR ART

A lamp may be provided with power by a dimmer so that the lamp can be operated at variable, selected light intensity levels. For example, luminaires for theatrical, architectural and other applications are often provided with operating power by dimmers. Phase angle dimmers for this purpose are well known, and typically include solid state switches such as SCRs for interconnecting an AC power source to a lamp load. AC voltage from the source is sinusoidal. A phase control circuit renders a solid state switch conductive at a point during a half cycle of the sinusoid, the point being selected to supply to the lamp a lamp operating pulse having a desired quantity of power in order to produce a desired level of light intensity. Switching operations are performed by the SCRs in a phase angle dimmer at a low frequency, for example once or twice in each power supply cycle of fifty or sixty cycles per second.

With a phase angle dimmer, the abrupt low frequency switching during the half cycles of the power supply and resultant abrupt amplitude changes in the current supplied to a luminaire can cause problems of electrical noise and mechanical filament noise, requiring extensive filtering. In some dimmer applications, even with filtering, the noise incident to phase angle dimming can be unacceptable. In addition, phase angle dimmers have the disadvantage that they can reflect harmonic distortion into the mains power supply.

To avoid the potential problems with low frequency phase angle dimming it has been proposed to use pulse width modulation (PWM) techniques with solid state switches operating at a higher frequency. With this type of dimmer power supply, known as a switch mode or PWM power supply, light intensity is varied by changing the pulse width modulation duty cycle. The output, after filtering in an output load filter, can have a shape similar to the power supply wave form with attenuated amplitude. Typically both the input power supply and the attenuated output are sine waves. For this reason, pulse width modulation dimmers are also described as sinewave dimmers.

Asynchronous sinewave dimmers are well known. This type of dimmer uses pulse width modulation techniques to control high frequency switching of switching devices in series between the power supply and the output filter and load. The output filter includes an inductive component in which energy is stored when the series switching devices are conductive. A clamp section connected across the output filter and the load prevents undesirable voltage spikes and provides a path for energy stored in the output filter to reach the load when the series switching devices are nonconductive.

The clamp sections of typical asynchronous sinewave dimmers include parallel switching devices in circuit with anti parallel fast switching diodes. The diodes provide a switching function for turning on the parallel clamp switching devices in synchronism with the power supply wave form, so that one clamp switch is rendered conductive during positive power supply half cycles and the other clamp switch is rendered conductive during negative power supply half cycles.

This asynchronous approach has disadvantages. One problem is maintaining precise control of the clamp switching section close to the power supply zero crossing points. Another difficulty arises when the load is reactive, or when the load is small in relation to the output filter inductance, and the power supply voltage and current are not in phase. Dimmers in modern day applications are being required to control many types of reactive loads, such as power supplies for gas discharge and fluorescent lamps. U.S. Pat. Nos. 5,424,618; 5,500,576; 5, 5,714,847 and 6,346,778 describe asynchronous sinewave dimmers of this type.

An alternative to the typical asynchronous sinewave dimmer is a synchronous dimmer in which the clamp section is controlled in synchronism with the PWM signal rather than with the power supply waveform. In this approach, the clamp switches are operated by the inverse of the PWM signal so that when a series switch is conductive, the complementary clamp switch is nonconductive, and when the series switch is nonconductive, the complementary clamp switch is conductive. An advantage of the synchronous dimmer is that it operates effectively for both resistive and capacitive loads.

A potential problem with synchronous dimmers results from the alternate series and clamp switching sequence. For example, if the clamp switch is rendered conductive before the series switch reaches its nonconductive state, then there is a low resistance current path extending directly across the power supply. This could result in excessive current flow and heat and damage to circuit components including the switches. A similar situation would exist if the series switch were rendered conductive before the clamp switch reaches its nonconductive state.

The potential problem of simultaneous series and clamp switch conduction could be avoided by delaying the conduction of each switch for a period of time long enough to assure nonconduction of the complementary switch. However, this can introduce a time period during which neither the series switch nor the clamp switch is conducting. During this time period the lack of a flow path for current through the output filter could result in voltage spikes and an adverse effect on circuit component life and on the output power waveform. It would be desirable to provide a method for operating a synchronous sinewave dimmer with precise control of the alternate switching of the series and clamp switches.

U.S. Pat. No. 5,045,774 discloses one example of a known synchronous dimmer. In this arrangement, a bidirectional series power switch and a bidirectional shunt or clamp switch are alternately operated by control signals applied from a microprocessor based control through isolation sections to drivers for the power and shunt switches. The dimmer disclosed in this patent does not include any provision specifically for preventing switch conduction overlap or simultaneous switch nonconduction. In this type of circuit, it is believed that the alternate switching timing sequence results from the inherent or deterministic rise/fall/delay time characteristics of circuit components rather than from any precise control method.

SUMMARY OF THE INVENTION

A primary object of the present invention is to provide an improved method for controlling a synchronous sinewave dimmer. Other objects are to provide an improved sinewave dimmer control method that provides efficient power coupling through an output filter and load for both resistive and reactive loads; to provide an improved sinewave dimmer control method for precisely controlling the alternate switching sequence of the series and clamp switching devices; to provide an improved sinewave dimmer control method that maximizes efficient power transfer to a load and that minimizes undesirable voltage transients; to provide an improved sinewave dimmer control method that avoids overlapping conduction of the series and clamp switching devices; to provide an improved sinewave dimmer control method that avoids simultaneous nonconduction of the series and clamp switching devices; and to provide a sinewave dimmer control method that overcomes difficulties experienced with prior art methods.

In brief, in accordance with the invention there is provided a method for operating a sinewave dimmer to provide a power output signal from a power source having a varying waveform, the power output signal having the same waveform as, and a smaller magnitude than, the power source. The method includes supplying a pulse width modulation signal having a duty cycle corresponding to a desired output signal magnitude. A series circuit switch device between the power source and an integrating filter and a clamp circuit switch device shunting the integrating filter are alternately switched into conductive states. The switching operation includes rendering the series circuit switch device conductive in accordance with the pulse width modulation signal and rendering the clamp circuit switch device conductive in accordance with the inverse of the pulse width modulation signal. Each alternating conductive state of the series circuit switch device and the clamp circuit switch device is separated by a dead time in which both the first and second circuit paths are nonconductive.

DESCRIPTION OF THE DRAWING

The present invention together with the above and other objects and advantages may best be understood from the following detailed description of the preferred embodiment of the invention illustrated in the drawings, wherein:

FIG. 8 is a simplified flow chart of a routine performed by the programmable controller of the dimmer for controlling the series and clamp switches of the sinewave dimmer in accordance with the present invention; and FIG. 9 is a simplified flow chart of a routine performed by the programmable controller of the dimmer for supplying PWM series switching control signals, inverse PWM clamp switching control signals and dead time intervals for use by the routine of FIG. 8.

DETAILED DESCRIPTION OF THE PREFERRED EMBODIMENT

Figure 1:
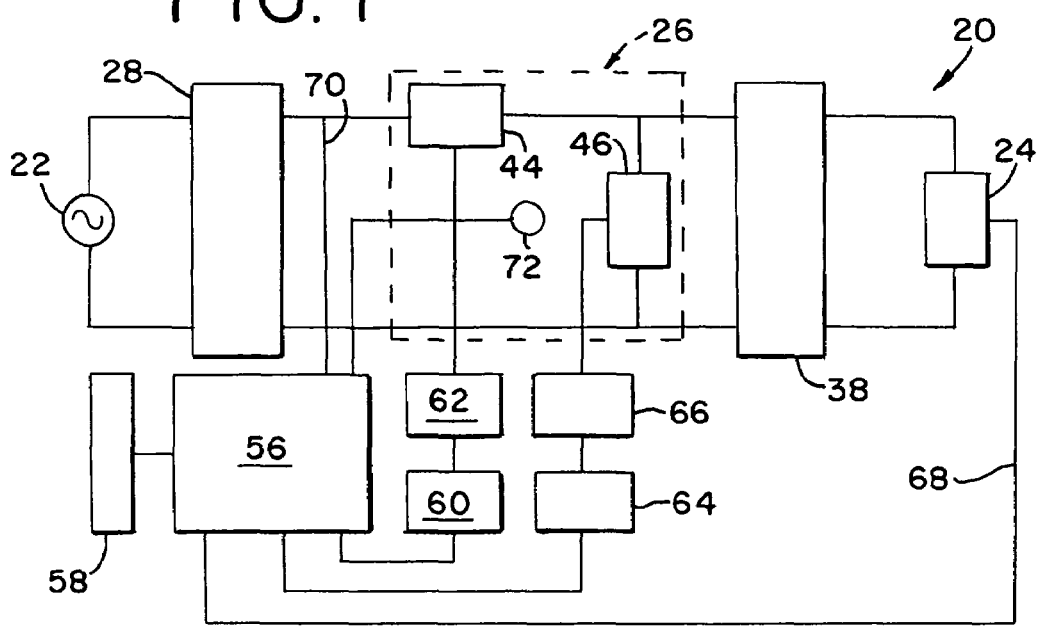
FIG. 1 is a block diagram of a synchronous sinewave dimmer with which the method of the present invention can be performed.

Having reference now to the drawing, FIG. 1 is a simplified block diagram of a synchronous sinewave dimmer designated as a whole by the reference character 20. The dimmer 20 is connected to a conventional mains power supply 22 providing a sinusoidal alternating current power supply waveform of, for example, nominal 120 volts ac. The dimmer 20 provides output power to a load 24. In a typical application, the load 24 may be a resistive load such as an incandescent lamp, or a reactive load such as a power supply for a gas discharge lamp or fluorescent lamp. A power switching stage 26 uses pulse width modulation (PWM) to attenuate input power and supply reduced output power to the load.

Figure 3:
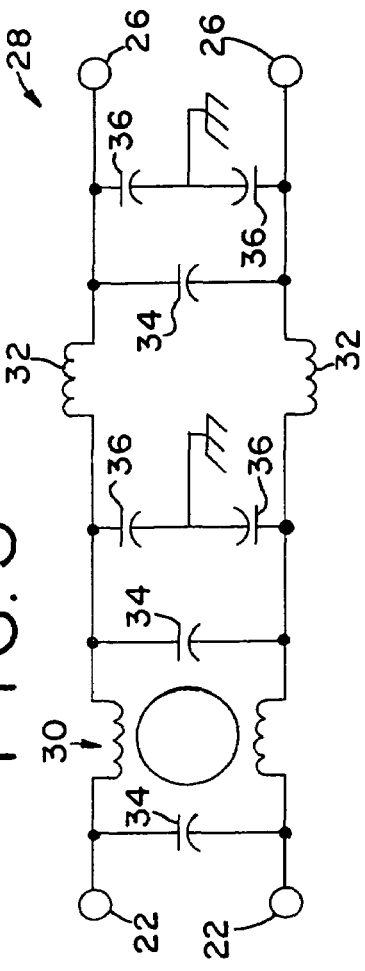
FIG. 3 is a schematic diagram of the input line filter of the dimmer.

An input line filter 28 filters out noise that may be present on the power supply signal and assures the supply of clean ac power to the power switching stage 26. In addition the input line filter 28 filters out switching noise from the power switching stage 26 and prevents the conduction of noise back to the power supply 22. Preferably the input line filter 28, as seen in FIG. 3, is a high order line filter including a common mode inductor 30, differential mode inductors 32, line to neutral differential mode X capacitors 34 and line/neutral to earth ground common mode Y capacitors 36.

Figure 4:
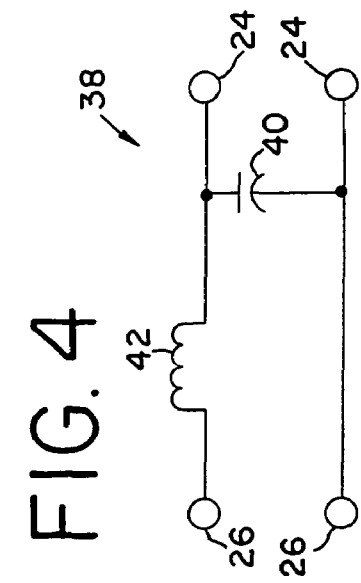
FIG. 4 is a schematic diagram of the output load filter of the dimmer.

An output load filter 38 filters out the PWM switching frequency of the power switching stage 26 and reconstructs the output voltage waveform into a line frequency, variable amplitude sinewave with the same frequency as the power supply sinewave. As seen in FIG. 4, the output load filter typically may include a bypass capacitance represented by capacitor 40. The core of the load filter is an output inductor 42 in series with the load 24 that stores energy and smoothes the output waveform. In order to accommodate a wide range of load values, preferably the inductor 42 is a swinging inductor. For example, the inductor 42 can have a reactance of 10 mH at an output current of 0.25 amp, a reactance of 1 mH at an output current of 10 amps and a reactance of 0.5 mH at an output current of 20 amps.

The power switching stage 26 includes a series switching section 44 connected in series between the power supply 22 and the series connected load 24 and load inductor 42. The power switching stage 26 also includes a clamp switching section 46 shunted across the series connected load 24 and load inductor 42. The series switching section 44 is alternately rendered conductive and nonconductive at a high frequency with a PWM signal having a duty cycle chosen to provide a desired output power level. The clamp switching section 46 is alternately rendered nonconductive and conductive by the inverse of the PWM signal so that the clamp switching section 46 is nonconductive when the series switching section 44 is conductive, and so that the series switching section 44 is nonconductive when the clamp switching section 46 is conductive. The power switching stage 26 preferably operates at a high frequency of at least 20 kilohertz, with about 50 kilohertz being preferred.

Figure 2:
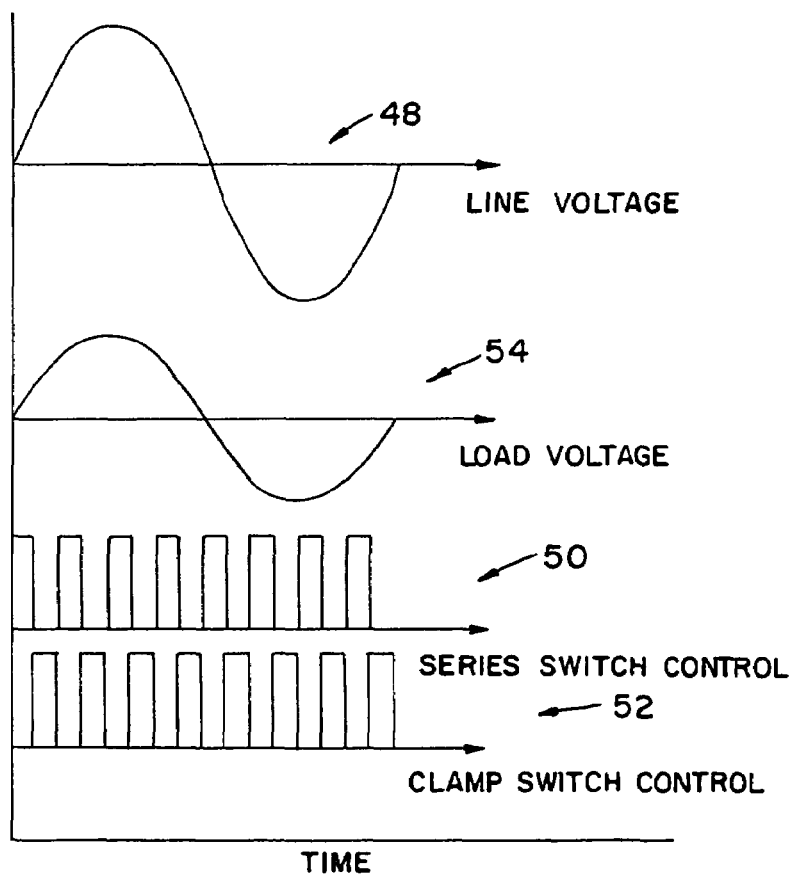
FIG. 2 a graph showing pulse width modulation operation of the phase angle dimmer.

FIG. 2 graphically illustrates the operation of the power switching stage 26. The operating frequency seen in FIG. 2 is very low and is not representative of an actual high frequency PWM operation, but permits the PWM operation to be shown graphically. Curve 48 shows the input sinusoidal ac waveform. Curve 50 shows a control signal for rendering the series switching section 44 alternately conductive and nonconductive with a fifty percent duty cycle. Curve 52 shows the complementary control signal for rendering the clamp switching section 46 alternately nonconductive and nonconductive. Curve 54 shows the output load signal resulting from chopping of the input signal by the series switching section 44, smoothed by the output load filter 38. With the fifty percent duty cycle, the output waveform amplitude is approximately one-half of the power supply waveform amplitude.

As seen in FIG. 1, a microprocessor based programmable controller 56 controls the operation of the series and clamp switching sections 44 and 46 by providing switching control signals such as those seen in FIG. 2. The controller 56 includes or has access to program and data memory and is programmable by instructions loaded into program memory in the form of data received from a data input-output bus or device 58. One example of a programmable controller suitable for the practice of the present invention is a Model 56F803 hybrid digital signal processor (DSP) and controller sold by Freestyle Semiconductor, Inc. (Motorola) and described in 56F803 Evaluation Module Hardware User's Manual, Rev. 4, Jun. 3, 2003, incorporated here by reference.

The controller 56 under software control supplies high frequency PMW series switching control signals to the series switching section 44 through an opto-isolation circuit 60 and a driver circuit 62. Similarly, the controller 56 under software control supplies high frequency inverse PMW series switching control signals to the clamp switching section 46 through an opto-isolation circuit 64 and a driver circuit 66.

The controller 56 receives feedback signals through line 68 indicating the load voltage and the load current. These signals can be used under software control to adjust the PWM and inverse PWM control signals in order to accurately regulate the output load signal. In addition, as described below, these signals can be used in controlling the dimmer 20 to maximize efficient power transfer to the load 24 in accordance with the present invention.

On line 70 the controller 56 receives a feedback signal indicating the power supply voltage. This signal can be used under software control for power signal zero crossing detection, and for adjusting the PWM and inverse PWM control signals in order to accurately regulate the output load signal. A sensor 72 associated with the power switching stage 26 provides an operating temperature feedback signal that may be used, for example, for excess temperature power decrease or shutoff capability.

Figure 5:
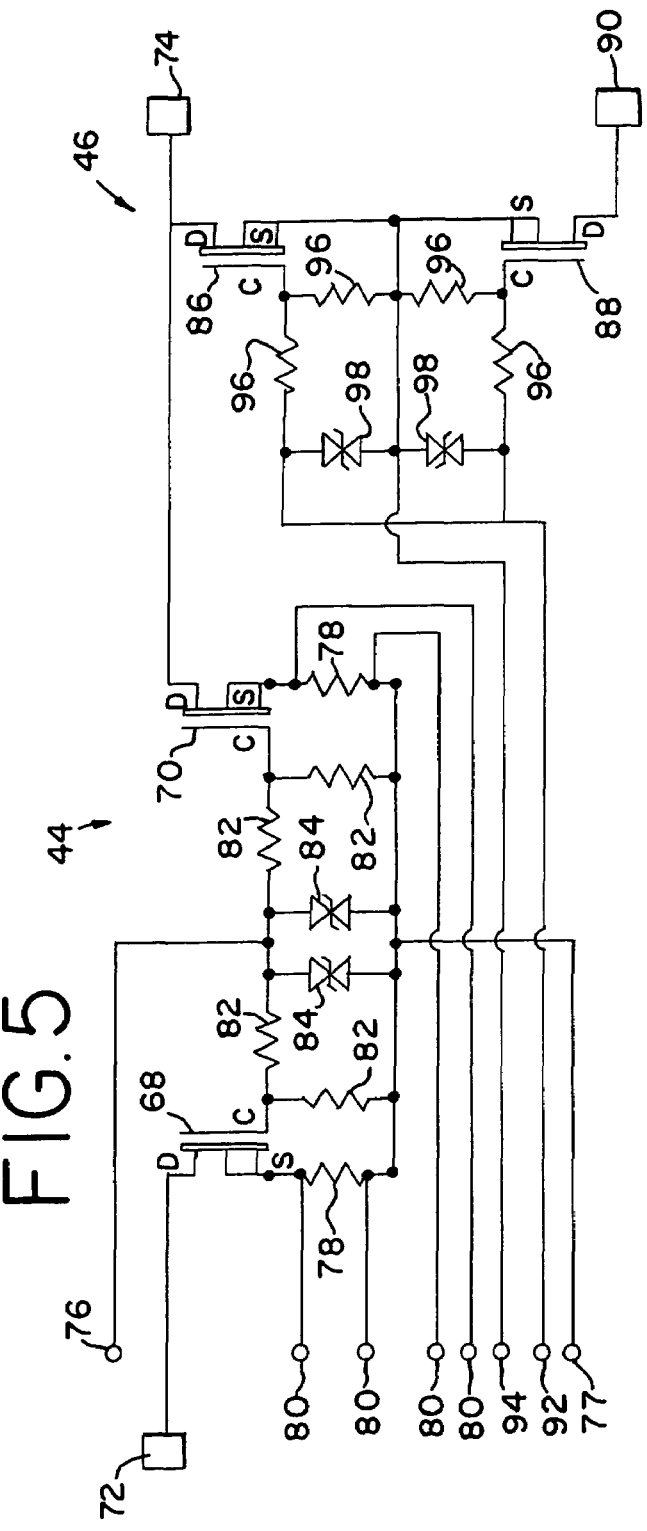
FIG. 5 is a schematic diagram of the power switching stage of the dimmer.

The power switching stage 26 is shown in more detail in FIG. 5. The series switching section 44 includes a complementary pair of MOSFETs 68 and 70 functioning as a high speed, high power, bidirectional switch connected in series between a power supply terminal 72 connected to the line input filter 28 and a load output terminal 74 connected to the inductor 42 of the output load filter 38. The MOSFETs 68 and 70 are simultaneously rendered conductive or nonconductive by a high frequency PWM control signal supplied by the controller 56 and applied through opto-isolator circuit 60 and driver circuit 62 across a gate control input terminal 76 and a ground terminal 77. Current sensing resistors 78 connected between ground and the source terminals of the MOSFETs 68 and 70 provide signals to terminals 80 for use by the controller 56 for overcurrent protection or the like. Resistors 82 serve as bleeder resistors and stabilizing series resistors connected to the gate terminals of the MOSFETs 68 and 70. Bidirectional zeners 84 provide transient protection.

The clamp switching section 46 includes a complementary pair of MOSFETs 86 and 88 functioning as a high speed, high power, bidirectional switch connected in series between the load output terminal 74 and a load neutral terminal 90. The MOSFETs 86 and 88 are simultaneously rendered nonconductive or conductive by a high frequency inverse PWM control signal supplied by the controller 56 and applied through opto-isolator circuit 64 and driver circuit 66 across a gate control input terminal 92 and a ground terminal 94. Resistors 96 function as bleeder resistors and stabilizing series resistors connected to the gate terminals of the MOSFETs 86 and 88. Bidirectional zeners 98 provide transient protection.

Although other types of high power solid state switching devices, such as IGBTs, might be used for the series and clamp switching sections 44 and 46, MOSFETs are preferred because of their superior high speed and high power switching characteristics. In addition, the bidirectional nature and fast switching speeds of MOSFETs make them preferable for a synchronous dimmer having both series and clamp high speed switching.

In accordance with the present invention, the controller 56 is software controlled to insert precisely determined dead times between the series and clamp control signals. This is illustrated generally, and not to scale, in FIG. 6. Curve 100 shows a pair of series switch PWM "on" control signals 102 for rendering the series switching section 44 conductive. These signals are separated by an "off" interval in which the series switching section 44 is nonconductive. Curve 104 shows a clamp switch inverse PWM "on" control signal 106 for rendering the clamp switching section 46 conductive. The "on" signal 106 of curve 104 is located within the "off" interval of curve 100.

Figure 6:
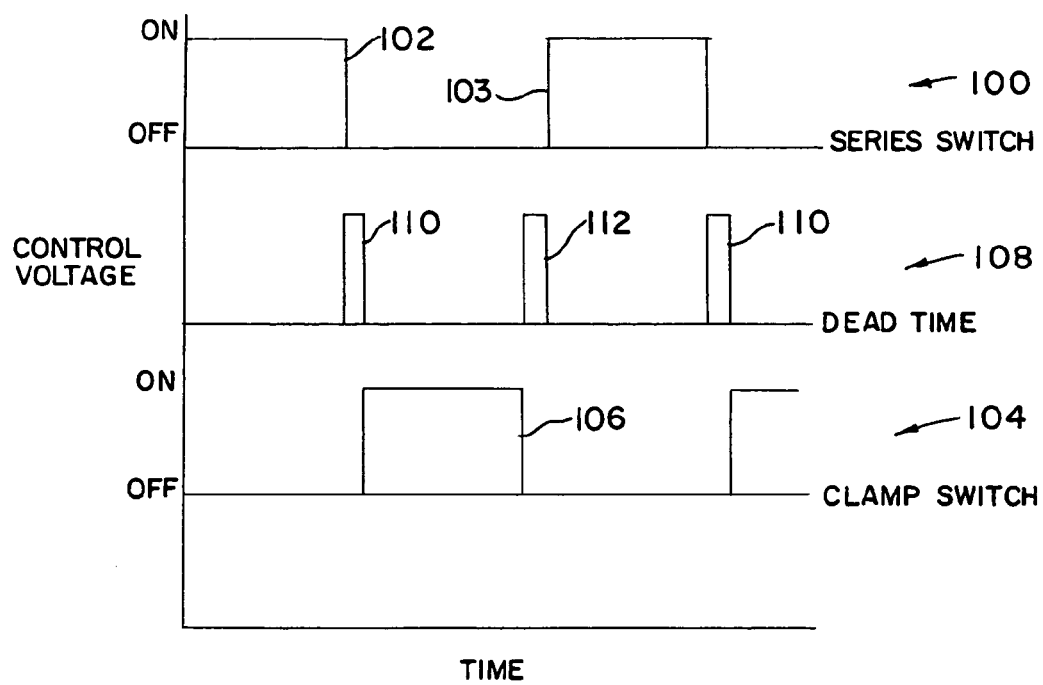
FIG. 6 is a graph showing the software controlled insertion of dead time between alternate series and clamp switch control signals.

Curve 108 of FIG. 6 illustrates a dead time interval 110 beginning at the end of each series switch PWM "on" control signal 102 and ending at the beginning of each inverse PWM "on" control signal 106. During this dead time interval neither the series switching section 44 nor the clamp switching section 46 is receiving an "on" signal 102 or 106. The dead time interval 110 is selected to be to be long enough that so that switching of the series switching section 44 can be reliably completed and so that a condition of simultaneous conduction of the series switching section 44 and the clamp switching section 46 is avoided. In addition, the dead time interval is selected to be as short as possible, i.e., no longer than necessary in order to reliably complete the switching operations. As a result, the clamping switching section 46 is rendered conductive as soon as possible after the series switching section 44 is rendered nonconductive to establish a circuit path for efficient dissipation through the load 24 of energy stored in the output load filter inductor 42. This avoids undesirable voltage spikes that can distort the desired sinewave output waveform and can result in circuit component damage.

Curve 108 also illustrates another dead time interval 112 beginning at the end of each inverse PWM "on" control signal 106 and ending at the beginning of each series switch PWM "on" control signal 102. The dead time interval 112 is selected to be to be long enough that so that switching of the clamp switching section 46 can be reliably completed and so that a condition of simultaneous conduction of the series switching section 44 and the clamp switching section 46 is avoided. If circuit characteristics or power dissipation requirements permit, it would be possible for the dead time intervals 110 and 112 to have different lengths, however, it is presently preferred that they have the same length.

The dead time intervals 110 and 112 are supplied under software control by the programmable microprocessor based controller 56. Therefore the dead time intervals 110 and 112 have a precise value that is not dependent on complex deterministic rise, fall or delay times of circuit components.

As a result efficient switching and power transfer to the load 24 are maximized. With the preferred PWM switching frequency of 50 kilohertz, and if a fixed time length is used for the dead time intervals 110 and 112 as seen in FIG. 6, the preferred dead time interval is 150 nanoseconds.

Figure 7:
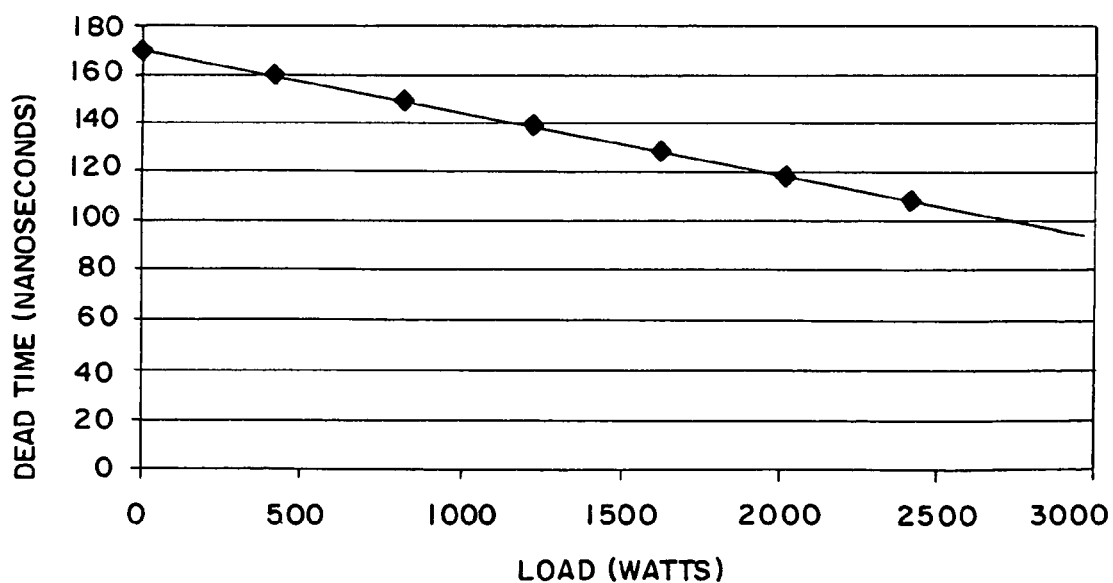
FIG. 7 is a graph showing a relation between dead time duration and load power.

A fixed dead time interval provides the advantages of reliable and efficient operation, but may be a compromise because it may be possible to decrease the duration of the dead time interval as load power increases. In accordance with a feature of the invention, the controller 56 may be program controlled to supply variable dead times 110 and 112 based on load power. As seen in FIG. 7 for example, the dead times 110 and 112 can be varied linearly from a maximum value of 170 nanoseconds at very low or no load conditions to a shorter duration of 110 nanoseconds when the output load is 2,500 watts. The variable dead times can even further maximize efficiency of the control of the dimmer 20.

A routine performed by the programmable controller 56 for operating the series switching section 44 and the clamp switching section 46 is illustrated in the simplified flow chart of FIG. 8. The routine starts at block 114. At block 116 the controller sends a series switch "on" signal 102 (see FIG. 6) to render conductive the MOSFETs 68 and 70 of the series switching section 44 to permit current flow through the dimmer 20 from the power supply 22 to the load 24. The duration of the signal 102 is stored in data memory of the controller 56, and is a result of the PWM duty cycle required to output the desired sinusoidal output load waveform to the load 24. At the end of the series switch "on" signal 102, the MOSFETs 68 and 70 of the series switching section 44 return to their nonconductive condition, interrupting current flow to the output load filter inductor 42 and load 24.

At block 118, the controller waits for a time period equal to the dead time interval 110. This time interval is stored in the data memory of the controller 56. During this dead time interval 110, the switching operation of the series switching section 44 is reliably completed.

At the end of the dead time interval, at block 120, the controller sends a clamp switch "on" signal 106 (see FIG. 6) to render conductive the MOSFETs 86 and 88 of the clamp switching section 46. This permits energy stored in the output load filter inductor 42 to cause current to flow in the inductor 42 and the load 24. The duration of the signal 106 is stored in data memory of the controller 56, and is a result of the inverse of the PWM duty cycle required to output the desired sinusoidal load waveform to the load 24. At the end of the clamp switch "on" signal 106, the MOSFETs 86 and 88 of the clamp switching section 46 return to their nonconductive condition, interrupting clamp current flow between the output load filter inductor 42 and the load 24.

At block 122, the controller 56 waits for a time period equal to the dead time interval 112. This time interval is stored in the data memory of the controller 56. If a single length of time is used for both the dead time intervals 110 and 112, only a single dead time value need be stored in the data memory of the programmer 56. During this dead time interval 112, the switching operation of the clamp switching section 46 is reliably completed.

Decision block 124 is included to represent a way for the controller to discontinue sending control signals to the series and clamp switching sections 44 and 46, for example in the event of powering down of the dimmer 20 or a feedback responsive interrupt or the like. If the dimmer switching operation is ending, the routine terminates at end block 126, and if not, the routine repeats.

FIG. 9 illustrates a simplified periodic routine for getting or calculating, and then storing in data memory, the control signals 102 and 106 and the dead time intervals 110 and 112. This routine starts at block 127. The user of the dimmer 20 can select a output load amplitude, corresponding for example to light intensity of a lamp load, by inputting data to the controller 56 by way of the data bus or device 58. In decision block 130, this input data is checked to see if a change in output load amplitude is requested. If not, the routine is ended at end block 131. In this case, the values stored in data memory for control signals and dead time remain unchanged.

If a new output power amplitude is requested, the new PWM and inverse PWM duty cycles are established at blocks 132 and 134. There are various ways in which these steps can be performed. The controller 56 can calculate the duty cycle and inverse duty cycle from the input data, and derive the corresponding series switch and clamp switch control signal values 102 and 106. Alternatively a look up table can be stored in controller memory to provide the series switch and clamp switch control signal values 102 and 106. In any case, at blocks 134 and 136, the durations of the series switch and clamp switch control signal values 102 and 106 are stored in data memory for access gy the FIG. 8 routine at blocks 116 and 120.

If a fixed dead time interval is used, it can be stored in data memory of the controller 56 as data input through the bus or device 58. The dead time interval is then available in memory for use by the controller 56 in the routine of FIG. 8 at blocks 118 and 122. In this case, the routing can end at block 131 following block 136.

If a variable dead time interval is used, the FIG. 9 routine further includes blocks 138–142. In block 138, controller 56 obtains the load current and load voltage values provided by feedback line 68 (FIG. 1). In block 140, the load power can be calculated or determined based on the load current and voltage values. In block 142 the dead time interval is established either by a calculation or by accessing a look up table in controller memory. For example a look up table based on the graph of FIG. 7 can be loaded into data memory. In this block, the dead times 110 and 112, or a single dead time value, is stored in data memory for use by the routine of FIG. 8 at blocks 118 and 122.

While the present invention has been described with reference to the details of the embodiment of the invention shown in the drawing, these details are not intended to limit the scope of the invention as claimed in the appended claims.

What is claimed is:

1. A method for operating a sinewave dimmer to provide a power output signal from a power source having a varying waveform, said method comprising:

supplying a pulse width modulation signal having a duty cycle corresponding to a desired magnitude proportion of the output power signal;

alternately switching into conductive states a series circuit switch device between the power source and an integrating filter and a clamp circuit switch device shunting the integrating filter;

said switching including rendering the series circuit switch device conductive in accordance with the pulse width modulation signal and rendering the clamp circuit switch device conductive in accordance with the inverse of the pulse width modulation signal; and separating each alternating conductive state of the series circuit switch device and the clamp circuit switch device with a dead time interval in which both the first and second circuit paths are nonconductive.

2. A method as claimed in claim 1 wherein the power output signal and the power source have sinusoidal waveforms.

3. A method as claimed in claim 2 wherein said switching and separating steps are performed by a microprocessor based programmable controller having a memory, and wherein said dead time interval is stored in the memory.

4. A method as claimed in claim 3 wherein the dead time intervals following conduction of the series circuit switch are of the same length as the dead time intervals following conduction of the clamp circuit switch.

5. A method as claimed in claim 4 wherein the pulse width modulation frequency is over about twenty kilohertz.

6. A method as claimed in claim 5 wherein the pulse width modulation frequency is about fifty kilohertz.

7. A method as claimed in claim 5 wherein the dead time interval is in the range of from about 100 to about 180 nanoseconds.

8. A method as claimed in claim 5 wherein the dead time interval is about 150 nanoseconds.

9. A method as claimed in claim 5 wherein the dead time interval is fixed.

10. A method as claimed in claim 5 further comprising feeding back output power information to the controller, and varying the dead time interval in the controller in accordance with changes in the feedback output power information.

11. A method as claimed in claim 10 wherein the dead time interval is increased when the feedback output power decreases.

12. A method for operating a sinewave dimmer to provide a power output signal from a power source having a varying waveform, said method comprising:

supplying a pulse width modulation signal having a duty cycle corresponding to a desired magnitude proportion of the output power signal;

alternately switching into conductive states a series circuit switch device between the power source and an integrating filter and a clamp circuit switch device shunting the integrating filter;

said switching including rendering the series circuit switch device conductive in accordance with the pulse width modulation signal and rendering the clamp circuit switch device conductive in accordance with the inverse of the pulse width modulation signal; and following each conductive state of the series circuit switch device with a dead time interval in which both the first and second circuit paths are nonconductive;

said switching and following steps being performed in a microprocessor based programmable controller having memory, and said dead time interval being stored in the controller memory.

13. A synchronous sinewave dimmer for use with a load and with a power supply having an ac power supply signal, said synchronous sinewave dimmer comprising:

an input line filter for connection to the power supply;

an output load filter having an output load inductor in series with the load;

a power switching stage between said input line filter and said output load filter, said power switching stage having a series switching stage connected in series with said output load filter and with the load and a clamp switching stage connected to shunt said output load filter and the load;

a microprocessor based programmable controller having an input and memory, said controller providing series and clamp control signals for operating said series and clamp switching stages alternately in a conductive condition with a pulse width modulation duty cycle based on load power information received at said input; and a dead time interval stored in said memory and used by said controller for separating said series and clamp control signals.

14. A synchronous sinewave dimmer as claimed in claim 13, said dead time interval being fixed.

15. A synchronous sinewave dimmer as claimed in claim 14, said dead time interval being about 150 nanoseconds.

16. A synchronous sinewave dimmer as claimed in claim 13 further comprising an output power feedback connection between the load and said controller, and said controller varying said dead time interval in accordance with changes in output power.

17. A synchronous sinewave dimmer as claimed in claim 13, said power switching stage and said clamp switching stage both including complementary pairs of MOSFETs.

* * * * *